(12) United States Patent
Kosar et al.

(10) Patent No.: US 8,254,377 B1
(45) Date of Patent: Aug. 28, 2012

(54) SYSTEM AND METHOD FOR HLR SUPPORT FOR IP-MSC FEATURE ACTIVATION

(75) Inventors: Therese Keenan Kosar, Richardson, TX (US); Erik Kosar, Richardson, TX (US)

(73) Assignee: Metropcs Wireless, Inc., Richardson, TX (US)

( * ) Notice: Subject to any disclaimer, the term of this patent is extended or adjusted under 35 U.S.C. 154(b) by 0 days.

(21) Appl. No.: 13/226,142

(22) Filed: Sep. 6, 2011

(51) Int. Cl.
*H04L 12/66* (2006.01)

(52) U.S. Cl. ........ 370/354; 370/338; 370/352; 370/353; 370/355; 370/356

(58) Field of Classification Search ............... None
See application file for complete search history.

(56) References Cited

U.S. PATENT DOCUMENTS

| | | | |
|---|---|---|---|
| 6,940,857 B2 | 9/2005 | Weinman, Jr. | |
| 7,031,747 B2 | 4/2006 | Cyr et al. | |
| 7,295,843 B2 | 11/2007 | Ejzak et al. | |
| 7,876,719 B2 | 1/2011 | Bakker et al. | |
| 2001/0031635 A1 | 10/2001 | Bharatia | |
| 2002/0110104 A1 | 8/2002 | Surdial et al. | |
| 2002/0196775 A1 | 12/2002 | Tuohino et al. | |
| 2003/0027569 A1 | 2/2003 | Ejzak | |
| 2004/0058692 A1* | 3/2004 | Kall et al. ........... | 455/456.1 |
| 2005/0108417 A1 | 5/2005 | Haumont | |
| 2007/0070976 A1* | 3/2007 | Mussman et al. ......... | 370/351 |
| 2009/0129372 A1 | 5/2009 | Pandey et al. | |
| 2009/0201922 A1 | 8/2009 | Long et al. | |
| 2009/0268702 A1* | 10/2009 | Hua et al. ........ | 370/338 |
| 2010/0041398 A1* | 2/2010 | Sand et al. ........ | 455/433 |
| 2010/0309822 A1 | 12/2010 | Witzel et al. | |
| 2011/0117910 A1* | 5/2011 | Bae ........... | 455/433 |

FOREIGN PATENT DOCUMENTS

| | | |
|---|---|---|
| EP | 1816877 A1 | 8/2007 |
| EP | 2040508 A1 | 3/2009 |
| GB | 2440987 A | 2/2008 |
| WO | 9526094 A1 | 9/1995 |
| WO | 2005039132 A1 | 4/2005 |
| WO | 2007100735 A2 | 9/2007 |
| WO | 2008026094 A1 | 3/2008 |
| WO | 2010020417 A2 | 2/2010 |

OTHER PUBLICATIONS

Marla R. G. Azada, Richard R Fjzak, John J. MacNamara, Donna Sand, and Robin Thompson "Seamless Mobility Across IMS and Legacy Circuit Networks" Bell Labs Technical Journal 10(4), 25-38 (2006).

(Continued)

*Primary Examiner* — Jae Y Lee
(74) *Attorney, Agent, or Firm* — Howison & Arnott, L.L.P.

(57) ABSTRACT

A method for managing services for a network service provider includes the steps of receiving a Feature Request Message from a switching node associated with a mobile station within a non-circuit switched network at a registration node. The Feature Request Message includes a code for activating a feature within the registration node enabling connections to the non-circuit switched network. A service request is received for providing a network service to the mobile station at the registration node. The service request is routed to the switching node associated with the non-circuit switched network responsive to the feature within the registration node enabling connection to the non-circuit switched network being activated.

19 Claims, 3 Drawing Sheets

OTHER PUBLICATIONS

James Radley "Getting to IMS: Migrating the HLR to the HSS" Articles and Papers, Trillium Articles <http://www.ccpu.com/articles/2010/getting-ims-migrating-hlr-hss/>.

Jin-Ho Hwang et al "IMS Centralized Network Architecture towards Convergence Services" Systems and Networks Communications (ICSNC), 2010 Fifth International Conference on, Aug. 22-27, 2010. On pp. 283-288; Digital Object Identifier: 10.1109/ICSNC.2010.51 <http://ieeexplore.ieee.org/xpl/freeabs_all.jsp?arnumber=5635283>.

Russ Freen "The Evolution to IMS—Slow and Steady or Darwinian Leap?" Jun. 2006; tmcnet.com <http://emags.tmcnet.com/emags/2006/ims/IMS_June2006.pdf>.

* cited by examiner

SYSTEM AND METHOD FOR HLR SUPPORT FOR IP-MSC FEATURE ACTIVATION

TECHNICAL FIELD

The present invention relates to registration of a mobile station within a home location register, and more particularly, for the registration of a mobile station with a home location register through an IMS (IP multimedia subsystem).

BACKGROUND

As the mobile communication industry evolves increasingly toward the use of IP-based networks, there is a need to support the operation of mobile devices in both circuit switched and IP-based networks. Traditionally, the mobile station registers only with an MSC with either a circuit switch network or an IP-based network that is presently serving the mobile station. Since users are able to access both circuit switched and IP-based networks using mobile devices, the ability to access either type of network when available or the ability to attempt to connect with one and then the other would be of great benefit to service providers of mobile stations.

SUMMARY

The present invention as disclosed and described herein, in one aspect thereof comprises a method for managing services for a network service provider including the steps of receiving a Feature Request Message from a switching node associated with a mobile station within a non-circuit switched network at a registration node. The Feature Request Message includes a code for activating a feature within the registration node enabling connections to the non-circuit switched network. This is independent of traditional registration in the circuit switched network. A service request is received for providing a network service to the mobile station at the registration node. The service request is routed to the switching node associated with the non-circuit switched network responsive to the feature within the registration node enabling connection to the non-circuit switched network being activated.

BRIEF DESCRIPTION OF THE DRAWINGS

For a more complete understanding, reference is now made to the following description taken in conjunction with the accompanying Drawings in which.

DETAILED DESCRIPTION

Figure 1:
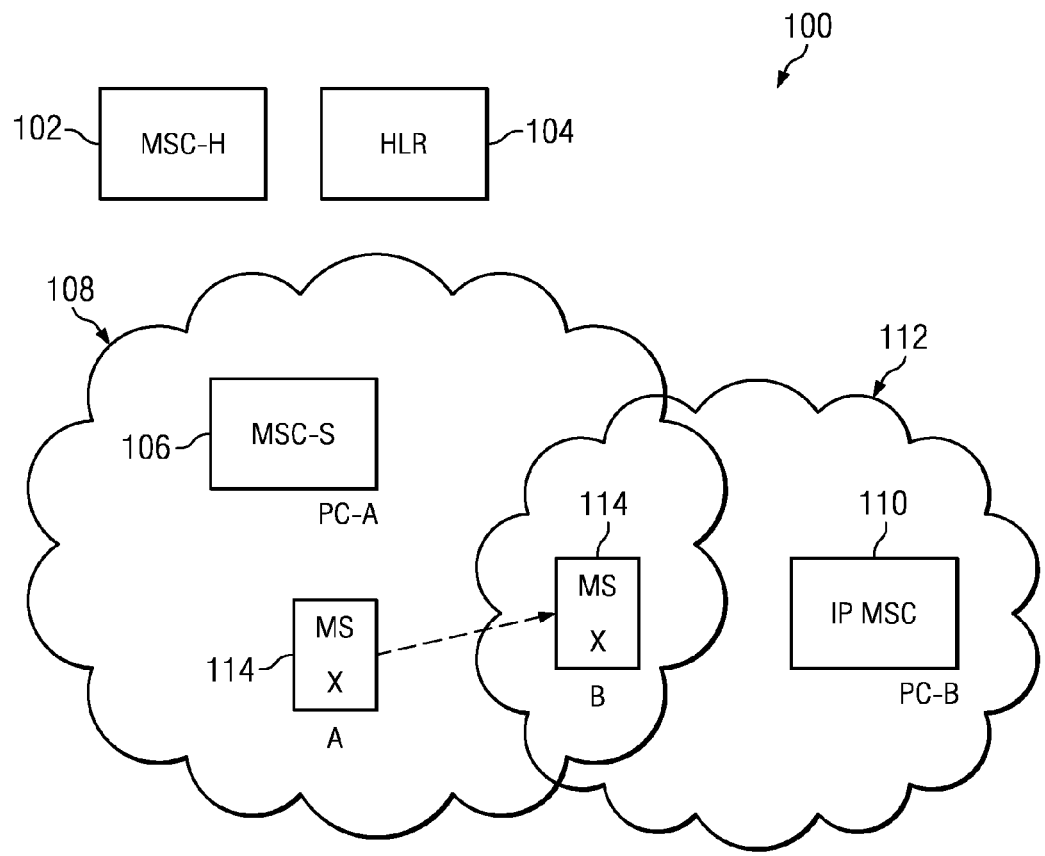
FIG. 1 illustrates an embodiment of a system for a home location register providing both circuit switched and IP-based network registration support.

Referring now to the drawings, wherein like reference numbers are used herein to designate like elements throughout, the various views and embodiments of a system and method for HLR support for IP-MSC feature activation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated an embodiment of a system 100 for a home location register (HLR) providing both circuit switched and IP-based network registration support. The system 100 includes a home mobile switching center (MSC-H) 102, a home location register (HLR) 104, a circuit switch mobile switching center (MSC-S) 106 having a circuit switched service area 108, an IP-based mobile switching center (IP-MSC) 110 having an IP-based coverage area and a mobile station (MS) 114. In various embodiments, the MSC-H 102 is responsible for routing voice calls and other network services such as messaging and data services to subscriber mobile devices within a network service provider's network. The MSC-H 102 sets up and releases end-to-end connections and handles mobility as well as hand-off requirements during the call. The MSC-H 102 sends a LOCREQ message to the HLR. The HLR determines where to route the call and sends back the appropriate TLDN to indicate where to terminate the call (in which network domain). The MSC-H 102 also interfaces with the public switched telephone network (PSTN) and all mobile-to-mobile and PSTN-to-mobile calls are routed through the MSC-H 102. Although various embodiments are illustrated as using a mobile switching center, it should be understood that in another embodiment, any network switching node may be used.

The HLR 104 includes a database of permanent subscriber information for subscribers of the network service provider's network. The HLR 104 is maintained by the network service provider and includes information associated with the subscriber such as a unique identifier associated with the subscriber, such as a mobile identification number, as well as subscriber preferences. The HLR 104 further stores location information associated with a particular subscriber which identifies the current location of the MS 114 within the service provider network. The current location information identifies a mobile switching center to which the MS 114 is currently registered as well as identifying the mobile switching center as being the mobile switching center for the mobile station. In various embodiments, the HLR 104 is provided with the capability to maintain registrations of the mobile station 114 within the circuit switched network and the IP-based network. During receipt of a call or a request for services directed to the mobile station 114 at the MSC-H 102, the MSC-H 102 queries the HLR for the current location information associated with the mobile subscriber 114 so that the call or service request can be routed to the MSC currently serving the MS 114 to which the MS 114 is registered. Although various embodiments are described herein as using an HLR, it should be realized that other embodiments of any network registration may be used.

The MSC-S 106 is a mobile switching center which services a circuit switched network encompassing the circuit switched coverage area 108. In a particular embodiment, the circuit switched network is a CDMA network. In other configurations, the circuit switched network may be a GSM network or any other type of circuit switched network domain. The MSC-S 106 provides circuit switched services to mobile subscribers such as MS 114 that are currently registered in the MSC-S 106 and to which the MSC-S 106 is acting as a serving mobile switching center. Examples of circuit switched services provided by the MSC-S 106 to mobile stations located within the circuit switched coverage area 108 include voice calls, SMS messaging, and circuit switched data services. Although various embodiments are described herein as using MSC-S 106, it should be understood that in other embodiments, any circuit switched network switching node may be used.

IP-MSC 110 is a mobile switching center that serves a packet switched network encompassing the packet switched coverage area. The packet switched network may comprise an IMS subsystem for providing IP-based multimedia information to the mobile station 114. An IMS subsystem supports a wide range of services enabled by the session initiated protocol (SIP). An IMS subsystem can provide traditional telephony services and non-telephony services such as instant messaging, push-to-talk, video streaming, multimedia messaging, etc. The IP-MSC 110 may include or comprise a telephony application server (TAS) for providing the telephony based services between the HLR 104 and the MS 114. The telephony application server (TAS) contains service logic for providing basic call processing services including digit analysis, routing, call setup, call waiting, call forwarding, call conferencing, etc. The TAS provides the service logic for invoking the media servers to provide the appropriate call progress tones and announcements. If calls are originating or terminating on a PSTN, the TAS provides the SS7 signaling to instruct the media gateways to convert the PSTN TDM voice bit stream to an IP RTP stream and to direct the stream to an IP address of the corresponding IP phone.

The IP-MSC 110 provides packet switch services to mobile subscribers such as MS 114 that are currently registered with the IP-MSC 110 into which the IP-MSC 110 is acting as a serving mobile switching center. Examples of packet switched services which may be provided by the IP-MSC 110 to mobile stations within the packet switched coverage area include voice over IP (VOIP) services, IP multimedia subsystem services and other types of packet data services. In at least one embodiment, the packet switched network is an internet protocol (IP) network. In still other embodiments, the packet switched network may be an LTE network, a Wi-Fi network or other type of packet switched network. Although various embodiments are described herein using IP-MSC 110, it should be understood that in other embodiments, any packet switched network switching node may be used.

MS 114 is a mobile subscriber station associated with a particular subscriber. In at least one embodiment, the MS 114 is a dual mode mobile device which includes circuitry that allows the MS 114 to establish connections and communicate over both circuit switched networks and packet switched networks. In various embodiments, the MS 114 may include a mobile telephone, a smart phone, a PDA, a touchpad or any other mobile communication device.

In various embodiments, a network operator configures the HLR to allow the MS 114 to register with either or both of the MSC-S 106 or the IP-MSC 110. The network operator further configures the HLR 104 to set routing preferences for various services provided by the MS 114. In particular, the network operator determines whether a particular call or service request will be routed to the MS 114 by either the MSC-S 106, or the IP-MSC 110.

Figure 2:
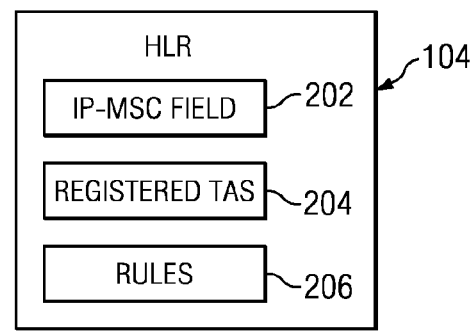
FIG. 2 illustrates an embodiment of a database structure for the HLR of FIG. 1.

Referring now to FIG. 2, the database of the HLR 104 is configured to include a number of different fields to enable registration of the IP-MSC 110 within the HLR 104. The IMS field 202 provides an indication that the subscriber is registered within the IMS domain and the IP-MSC feature is activated. The IMS field 202 is set to "true" (i.e., active) during IP-MSC feature activation or during provisioning. Additionally, a registered TAS field 204 is included for indicating the particular IP-MSC that will be handling calls for the subscriber. This field is used when the IMS field 202 indicates that the IP-MSC feature is activated and stores the location of the particular IP-MSC that is serving the subscriber. The registered TAS field 204 stores the MSC ID of the IP-MSC that has sent the message to the HLR.

The HLR 104 additionally includes routing rules 206 defining routing preferences associated with received connection requests. The routing rules define one or more routing algorithms to determine whether a particular request for services be provided to the MS 114 using circuit switched network or an IP-based packet switched network. In various embodiments, these routing preferences are configured to first attempt connections through the IMS network and if this is not available, then attempting connection through a circuit switched network such as a CDMA network, if available. The preferences do not utilize rules which route calls to an IMS network if a CDMA connection is not available. It should be understood that the particular database structure illustrated in FIG. 2 is shown for illustrative purposes and that in other embodiments other database structures for the HLR 104 may be used.

Using the database structure of FIG. 2, the HLR 104 may provide IMS domain activation for a subscriber mobile station 114 homed on the HLR 104. This functionality enables a mobile station 114 to be registered in the CDMA domain and also activated concurrently within the IMS domain. This enables the HLR 104 to terminate a call to a subscriber of the mobile station 114 and the CDMA domain network 108 or the IMS domain network 112. The HLR may also manage a subscriber with both CDMA and IP-based services depending on the location of the subscriber as well as the type of services needed.

Within this system configuration, a subscriber registered within the IMS domain network 112 via a SIP register message. The IMS TAS (IP-MSC 110) informs the HLR that the subscriber is activated within the IMS domain network 112 by sending an ANSI-41 FEATREQ message to the HLR 104 providing an indication that the IP-MSC feature is active. The HLR 104 is then activated to allow the subscriber to receive calls within the IMS domain.

Once configured in this fashion, the HLR 104 may perform a number of functions. These include the termination of calls within the CDMA domain if the subscriber is registered within the CDMA domain and the termination of calls within the IMS domain as long as the subscriber has the IP-MSC feature activated. The HLR 104 may also select which domain to terminate a call if the subscriber is registered within the CDMA domain and concurrently has the IP-MSC feature activated. Finally, the HLR 104 may provide terminating services such as call forwarding via the HLR 104 or notify the IMS domain as needed.

Figure 3:
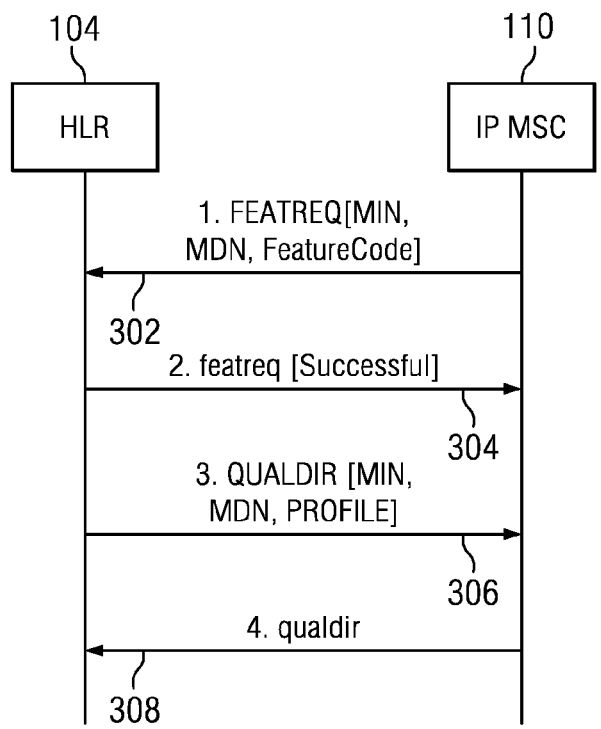
FIG. 3 illustrates a signaling diagram for activating an IMS calling feature.

Referring now to FIG. 3, there is illustrated the manner in which a subscriber associated with a particular IP-MSC 110 may notify the HLR 104 to activate the provision of an IMS feature to the subscriber using the SIP protocol FEATREQ message 302 that is transmitted from the IP-MSC 110 to the HLR 104. As illustrated in FIG. 3, the FEATREQ message 302 is transmitted from the IP-MSC 110 to the HLR 104 to request activation of services for a subscriber within the IMS domain. The FEATREQ message 302 will include a feature code that provides the indication that the IMS domain features should be activated within the HLR with respect to the subscriber. The FEATREQ message 302 will also include the mobile identification number (MIN) and the mobile directory number (MDN) that is associated with the particular mobile station 114.

Once the HLR 104 recognizes that the feature code within the FEATREQ message 302 has requested activation of IP-based calling, the IP address of the IP-MSC 110 is stored within the HLR 104. The HLR 104 generates a reply 304 to the FEATREQ message 302 indicating that the FEATREQ message was successfully received. A qualification directive (QUALDIR) 306 is provided from the HLR 104 to the IP-MSC 110 to provide the IP-MSC 110 with profile information associated with a particular subscriber that is identified by its MIN number and MDN number. The IP-MSC 110 sends back a reply 308 to the qualification directive 306 to indicate that the directive 306 was successfully received. Thus, as can be seen with respect to FIG. 3, the inclusion of a feature code within the FEATREQ message 302 enables the HLR 104 to be notified by the IP-MSC 110 that IMS services should now be made available to a particular mobile station 114.

Figure 4:
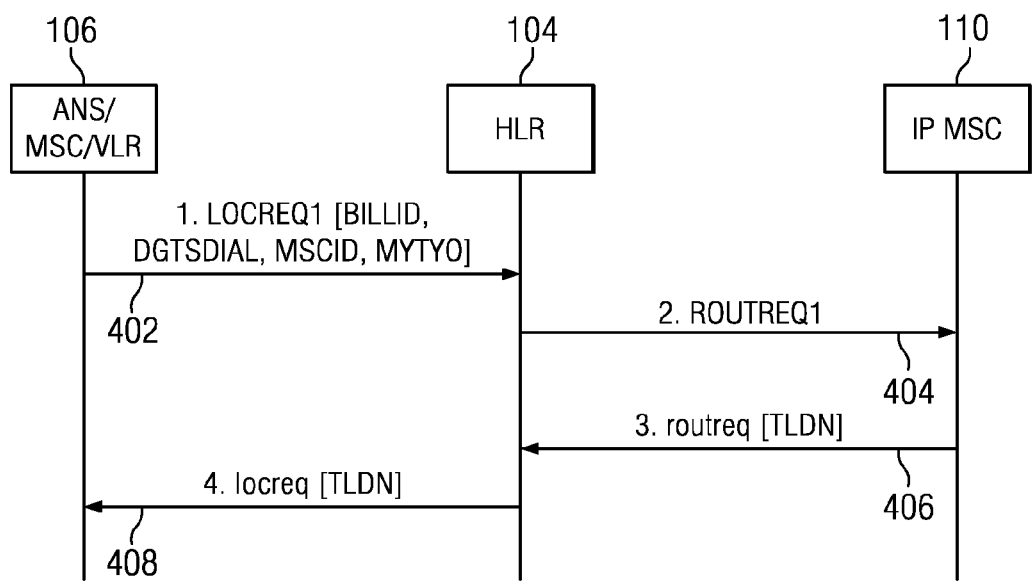
FIG. 4 illustrates a signaling diagram for establishing or terminating a connection within an IMS subsystem.

Referring now to FIG. 4, there is illustrated the manner for establishing a terminating connection from an MSC 106 located within a circuit switched network to a subscriber that is communicating through an IP-MSC 110. The MSC 106 transmits a LOCREQ invoke message 402 to the HLR 104. The LOCREQ message 402 includes the billing ID, digits dialed, ID of the MSC 106 making the call and the connection type. Responsive to the LOCREQ invoke request 402, the HLR 104 determines that the subscriber to which the call is directed has access to IP services and that the IP-MSC feature is enabled within the HLR 104. The HLR 104 attempts to establish a connection to the IP-MSC 110 by transmitting a ROUTREQ invoke message 404 thereto. The HLR 104 will ignore any CDMA VLR address that may also be active with respect to the subscriber in favor of first attempting the connection within the IMS domain. The IP-MSC 110 responds to the ROUTREQ message 404 with a routreq response 406 containing a temporary location directory number (TLDN) to be used from routing calls to the MS 114. The HLR 104 provides a locreq response message 408 back to the MSC 106 that includes the TLDN.

Figure 5:
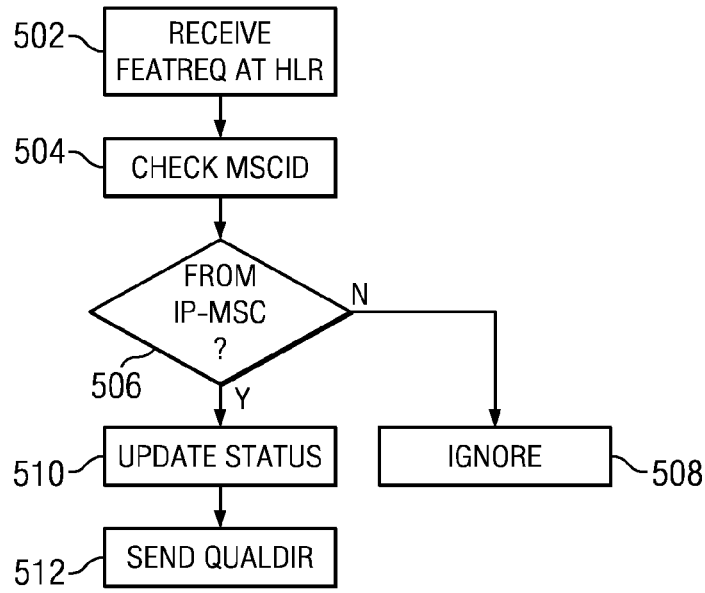
FIG. 5 is a flow diagram describing activation of IMS features for a subscriber.

Referring now to FIG. 5, there is illustrated a flow diagram describing the operations within the HLR 104 for the activation of IP-MSC connection features with respect to a particular subscriber. The HLR receives, at step 502, a feature request (FEATREQ) message including a code identifier indicating that the IP-based connection within the IMS should be established for the subscriber associated with the feature request message. Next, at step 504, the ID of the MSC that has forwarded the FEATREQ message is checked. Inquiry step 506 determines whether the FEATREQ message has been transmitted from an IP-MSC at step 506. If the feature request message has not come from an IP-MSC, the HLR cannot establish the IP-based connection service features to the MSC, and the message is ignored at step 508. However, if inquiry step 506 determines that the feature request message has come from an IP-MSC, the status of the subscriber is updated at step 510 to reflect the availability of IP-based connection services with respect to the IMS network and a qualification directive message (QUALDIR) is transmitted, at step 512, from the HLR to the IP-MSC that includes the CDMA mobile identification number, electronic serial number and profile (containing the MDN) of the subscriber.

If a subscriber in a CDMA domain dials a valid feature code (other than the IP-MSC feature activation code—for example Call forward unconditional activation), the MSC sends a FEATREQ message with the feature activation code to the HLR. Once the feature code is processed, a QUALDIR message is sent to the CDMA VLR to update the subscriber profile. If the subscriber also has the IP-MSC feature activated, the HLR sends a QUALDIR message to the IP-MSC where the subscriber is registered.

The reverse is the same. If a subscriber in the IMS domain dials a valid feature code, the IMS network (TAS) sends a FEATREQ message with the activation code to the HLR. Once the feature code is processed, a QUALDIR message is sent to the CDMA VLR where the subscriber is registered to update the subscriber profile. The HLR also sends a QUALDIR message to the IP-MSC where the subscriber is registered.

Figure 6:
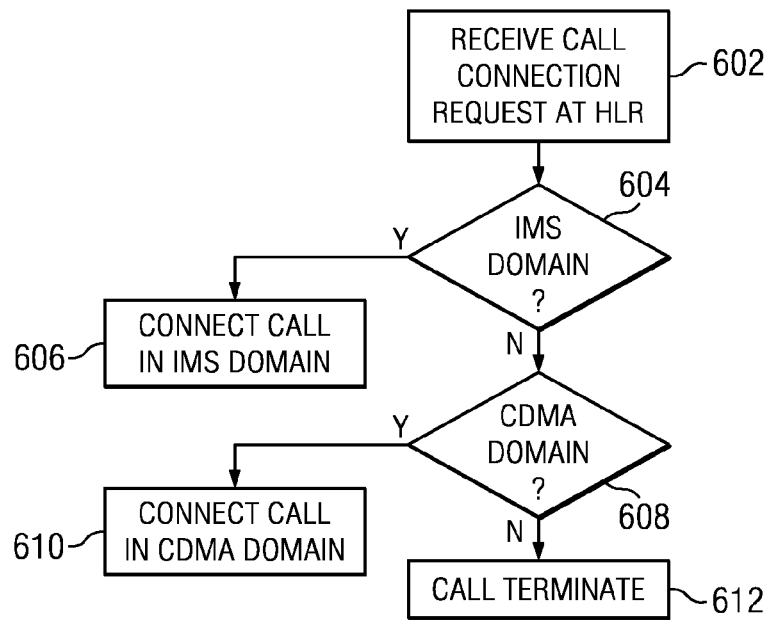
FIG. 6 is a flow diagram for establishing a call connection to an IMS subsystem and/or a circuit switched system.

Referring now to FIG. 6, once a particular subscriber has been registered as having the ability to provide call terminations within the IMS domain, a preferential termination process according to the routing rules within the HLR 104 establishes a preference for providing connections via the IMS domain rather than within the circuit switched domain. Upon receipt of a call connection request at step 602 at an HLR of a subscriber, the HLR determines at inquiry step 604 whether the subscriber may establish call connections within the IMS domain. If so, the call is completed to the subscriber within the IMS domain at step 606. If inquiry step 604 determines that call connections within the IMS domain are not possible for the subscriber, the HLR determines at inquiry step 608 whether a call connection may be established to the subscriber within a circuit switch domain such as CDMA. If a call may be established within the CDMA domain, the call connection is made within the CDMA domain at step 610. If the HLR determines that a call connection within the CDMA domain is not possible, the call is handled by a terminating service such as call forwarding or voicemail at step 612.

The above-described embodiments may be applied to any number of cases where a subscriber MDN is on an HLR 104 but calls may be terminated to the subscriber within a non-circuit switched system. Thus, the IMS system or IP-based network may be any other type of network connection wherein the location request message may include a feature code therein to indicate activation of services within this other type of domain. While allowing the subscriber to maintain activation within the circuit based system.

It will be appreciated by those skilled in the art having the benefit of this disclosure that this IMS feature base process provides a system and method for HLR support for IP-MSC feature activation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for managing services for a network service provider, comprising the steps of:
   receiving a Feature Request Message from a switching node associated with a mobile station within a non-circuit switched network at a home registration node, the Feature Request Message including a code for activating a feature within the home registration node enabling connections to the non-circuit switched network responsive to the code, wherein the home registration node stores an address of the switching node within the non-circuit switched network and ignores an address of visitor registration node in a circuit switched network that is also active with respect to the mobile station in favor of first attempting connection within the non-circuit switched network;

activating the feature within the home registration node enabling connections to the non-circuit switched network responsive to the Feature Request Message;

receiving a service request for providing a network service to the mobile station at the home registration node; and routing the service request to the switching node associated with the non-circuit switched network responsive to the feature within the home registration node enabling connection to the non-circuit switched network being activated.

2. The method of claim 1, wherein the home registration node comprises a Home Location Register (HLR).

3. The method of claim 1, wherein the non-circuit switched network comprises an Internet Protocol (IP) Multimedia Subsystem network.

4. The method of claim 1, wherein the switching node comprises a packet switched mobile switching center.

5. The method of claim 1, wherein the non-circuit switched network comprises an Internet Protocol (IP) network.

6. The method of claim 1, wherein the mobile station is also registered with a second switching node in a circuit switched network.

7. The method of claim 6, further including the step of routing the service request to the second switching node in the circuit switched network if the service request is not routed to the switching node associated with the non-circuit switched network.

8. A method for managing services for a network service provider, comprising the steps of:

receiving a Feature Request Message from a switching node associated with a mobile station within a non-circuit switched network at a home registration node, the mobile station currently registered with a second switching node in a circuit switched network, the Feature Request Message including a code for activating a feature within the home registration node enabling connections to the non-circuit switched network responsive to the code, wherein the home registration node stores an address of the switching node within the non-circuit switched network and ignores an address of visitor registration node in the circuit switched network that is also active with respect to the mobile station in favor of first attempting connection within the non-circuit switched network;

activating the feature within the home registration node enabling connections to the non-circuit switched network responsive to the Feature Request Message;

receiving a service request for providing a network service to the mobile station at the home registration node;

routing the service request to the switching node associated with the non-circuit switched network responsive to the feature within the home registration node enabling connection to the non-circuit switched network being activated; and routing the service request to the second switching node in circuit switched network if the service request is not routed to the switching node associated with the non-circuit switched network.

9. The method of claim 8, wherein the home registration node comprises a Home Location Register (HLR).

10. The method of claim 8, wherein the non-circuit switched network comprises an Internet Protocol (IP) network.

11. The method of claim 8, wherein the switching node comprises a packet switched mobile switching center.

12. The method of claim 8, wherein the non-circuit switched network comprises an Internet Protocol (IP) network.

13. A system for managing services for a mobile station by a network service provider, comprising:

a first switching node for a non-circuit switched network;

a second switching node for a circuit switched network;

a home registration node for storing a first indication that the home registration node provides connections to the mobile station within the non-circuit switched network and for storing an address of the first switching node within the non-circuit switched network, the home registration node configured to:

receive a Feature Request Message from the first switching node associated with the mobile station within the non-circuit switched network, the Feature Request Message including a code for activating a feature within the registration node enabling connections to the non-circuit switched network, wherein the home registration node stores the address of the first switching node within the non-circuit switched network and ignores an address of visitor registration node in circuit switched network that is also active with respect to the mobile station in favor of first attempting connection within the non-circuit switched network;

change the first indication within the home registration node responsive to the code;

activate the feature within the home registration node enabling connections to the non-circuit switched network responsive to the changed first indication;

receive a service request for providing a network service to the mobile station at the home registration node; and route the service request to the first switching node associated with the non-circuit switched network responsive to the first indication within the home registration node enabling connection to the non-circuit switched network being activated.

14. The system of claim 13, wherein the home registration node comprises a Home Location Register (HLR).

15. The system of claim 13, wherein the non-circuit switched network comprises an Internet Protocol (IP) network.

16. The system of claim 13, wherein the first switching node comprises a packet switched mobile switching center.

17. The system of claim 13, wherein the non-circuit switched network comprises an Internet Protocol (IP) network.

18. The system of claim 13, wherein the mobile station is also registered with the second switching node in a circuit switched network.

19. The system of claim 18, wherein the registration node is further configured to route the service request to the second switching node in the circuit switched network if the service request is not routed to the switching node associated with the non-circuit switched network.

* * * * *

UNITED STATES PATENT AND TRADEMARK OFFICE
CERTIFICATE OF CORRECTION

PATENT NO. : 8,254,377 B1
APPLICATION NO. : 13/226142
DATED : August 28, 2012
INVENTOR(S) : Therese Keenan Kosar and Erik Kosar It is certified that error appears in the above-identified patent and that said Letters Patent is hereby corrected as shown below:

Col. 7, line 1: Insert --a-- before "visi-"
Col. 7, line 46: Insert --a-- before "visitor reg-"
Col. 7, line 62: Insert --the-- before "circuit"
Col. 8, line 29: Insert --a-- before "visitor" and insert --the-- before "cir-"

Signed and Sealed this
Twenty-third Day of October, 2012

David J. Kappos
*Director of the United States Patent and Trademark Office*